United States Patent [19]

Benson et al.

[11] Patent Number: 5,098,147

[45] Date of Patent: Mar. 24, 1992

[54] LATCH FOR TRUCK OR TRAILER

[75] Inventors: LeDell E. Benson, Clintonville; Thomas H. Milbauer; Thomas H. Rineck, both of Marion; Dale E. Lehman, Tigerton, all of Wis.

[73] Assignee: Marion Body Works, Inc., Marion, Wis.

[21] Appl. No.: 504,932

[22] Filed: Apr. 5, 1990

[51] Int. Cl.⁵ .............................................. B62D 27/06
[52] U.S. Cl. ........................................ 296/43; 105/382
[58] Field of Search ................. 296/36, 43; 105/382, 105/380, 390; 280/147; 292/121, 85; 410/110

[56] References Cited

U.S. PATENT DOCUMENTS

| | | | |
|---|---|---|---|
| 530,078 | 12/1894 | Ammerman | 292/85 |
| 586,440 | 7/1897 | Kernek et al. | |
| 634,332 | 10/1899 | Gardner | 292/85 |
| 1,008,666 | 11/1911 | Munday | 296/43 X |
| 1,014,755 | 1/1912 | Jetté | 292/85 |
| 1,333,396 | 3/1920 | Erret | |
| 1,333,990 | 3/1920 | Mills | |
| 1,353,624 | 9/1920 | Bergstrom | |
| 1,392,206 | 9/1921 | Olson | 280/147 |
| 1,524,669 | 2/1925 | Milner | 296/43 |
| 1,534,101 | 4/1925 | Fisher | 296/43 |
| 1,535,128 | 4/1925 | Milner | 96/43 |
| 1,543,532 | 6/1925 | Timidaiski | 296/43 |
| 1,558,258 | 10/1925 | Flinchbaugh | 296/43 |
| 1,691,639 | 11/1928 | Charlebois et al. | 296/43 |
| 1,845,092 | 2/1932 | Meininghaus | 296/43 |
| 2,638,375 | 5/1953 | Jewell | 296/43 |
| 4,231,610 | 11/1980 | Stoll | 296/43 X |

FOREIGN PATENT DOCUMENTS

| | | | |
|---|---|---|---|
| 0244383 | 11/1987 | European Pat. Off. | 296/43 |
| 695703 | 8/1940 | Fed. Rep. of Germany | 292/85 |
| 2576273 | 7/1986 | France | 296/36 |
| 188570 | 3/1964 | Sweden | 292/336.3 |

Primary Examiner—Dennis H. Pedder
Attorney, Agent, or Firm—Foley & Lardner

[57] ABSTRACT

An apparatus for securing and releasing a stake in a stake pocket comprises a spring having a fastening end and a latch end. The fastening end is attached to an inside surface of the stake and the spring is biased such that the latch end positively engages the stake pocket. A selectively actuable release that effects the disengagement of the latch end of the spring from the pocket is also included. The release is disposed such that it may be actuated by a user's foot, when the user is standing at the level of the stake pocket in an upright position.

6 Claims, 7 Drawing Sheets

– continued –

LATCH FOR TRUCK OR TRAILER

FIELD OF THE INVENTION

This invention pertains generally to stake latches for the side and tailgates of a truck or trailer and in particular to a release mechanism for stake latches.

BACKGROUND OF THE INVENTION

Many trucks and trailers with platform bodies have removable side and/or tailgates to retain a load when the truck or trailer is moving and to facilitate loading and unloading the truck or trailer. The side or tailgates, called racks, are often comprised of wooden or steel horizontal slats connected by steel vertical stakes which extend below the slats and are inserted in a stake pocket to hold the tailgate or side rack in position. To remove the tailgate or side rack, the entire rack, including the stakes, is lifted upward, removing the stakes from the stake pockets.

Mechanisms to secure the stake in the stake pocket, to prevent bumps and vibrations from bouncing the stake out of the pocket when the truck is moving, are, in general, known. For, example, U.S. Pat. No. 1,535,128 issued to Milner Mar. 22, 1924, discloses a stake having a spring latch which secures the stake in the stake pocket. The spring latch exerts sufficient force on the stake to prevent the stake from being bounced out of the stake pocket, but the stake may be removed by forcibly jerking the stake upward and out of the stake pocket. The amount of force required to remove the stake must necessarily be enough to overcome the force with which the spring latch is retaining the stake in the stake pocket. The large force and the jerking action necessary to remove the stake makes this type of device difficult and unwieldy to use.

Other prior art devices employ a spring latch cooperating with a disengaging mechanism, which must be manually maintained in a disengaging position, to remove the stake. One such device, disclosed in U.S. Pat. No. 1,392,206 issued Sept. 27, 1921 to Olson, requires that a person actively hold a locking dog in a disengaging position while removing the stake from the stake pocket. The relatively small locking dog is located at the lower end of the spring latch, and must be manipulated by a person's fingers. In order to remove the stake one must simultaneously manipulate the dog while pulling upward on the rack. This necessitates that a person exert an upward force, sufficient to lift the rack, which typically weighs forty or more pounds, while bending over or kneeling.

Still other prior art devices disclose a spring latch cooperating with a mechanism which selectively locks the latch in a disengaged position. Examples of such latch devices may be found in U.S. Pat. Nos. 1,845,092 issued to Meininghaus, on Feb. 16, 1932; 1,543,532 issued June 23, 1925 to Timidaiski; and 1,534,101 issued Apr. 21, 1925 to Fisher. To operate such devices the user typically must manipulate a lock, generally located near the bottom of the stake pocket, with their fingers. Therefore, the user must either bend over or kneel down to lock the latch in a disengaged position. This is both uncomfortable and unnecessarily time consuming.

Accordingly, a device to latch and release a stake in a stake pocket which may be easily operated from a standing position on the deck of the platform is needed. The device would preferably be one that allows the stake to be removed in an ergonomic manner, i.e. in such a way that the user can remove the stake quickly, easily, and while standing in a natural position on the deck of the platform thereby decreasing the likelihood of strain or injury to the back of the user.

SUMMARY OF THE INVENTION

An apparatus for securing and releasing a stake in a stake pocket comprises, in accordance with the present invention, a spring having a fastening end attached to an inside surface of the stake and a latch end biased to positively engage the stake pocket. A release means for selectively effecting disengagement of the latch end from the pocket in response to an applied force is further included. The release means includes a first end accessibly disposed outside of the stake and a second end disposed in a predetermined relation with respect to the spring for selective cooperation with the spring, and is mounted to the stake such that force applied to the first end causes movement of the second end, relative to the spring, to move the latch end out of engagement with the pocket.

BRIEF DESCRIPTION OF THE DRAWING

A preferred exemplary embodiment will hereinafter be described in conjunction with the appended drawing, wherein like elements are denoted with like designation and.

DETAILED DESCRIPTION OF A PREFERRED EXEMPLARY EMBODIMENT

Figure 1:
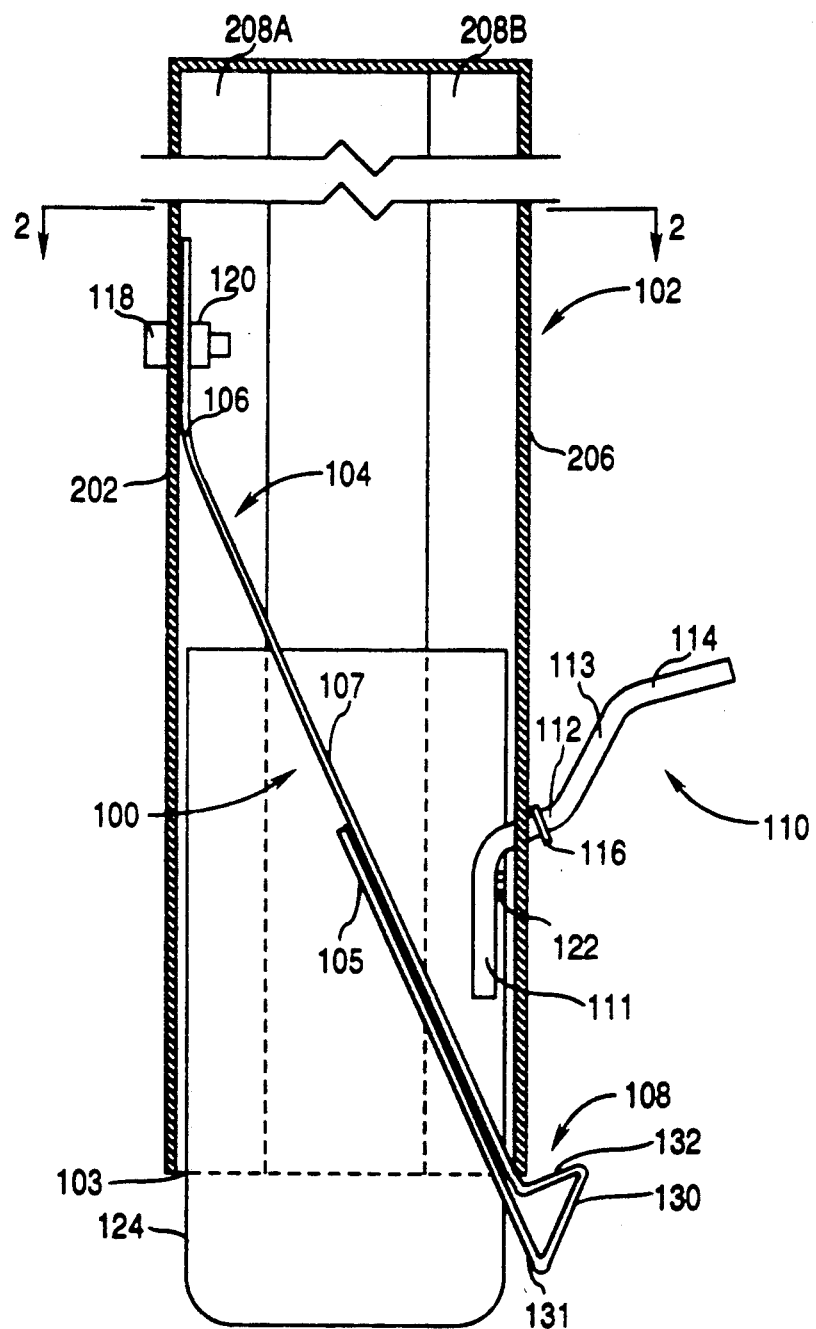
FIG. 1 is a front sectional view of a preferred exemplary embodiment.
Figure 2:
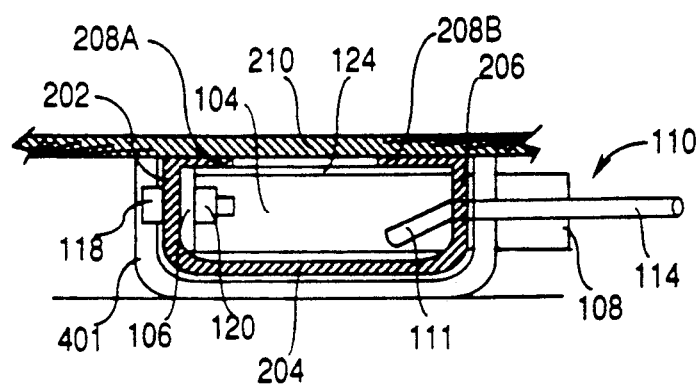
FIG. 2 is a cross sectional view taken on line 2—2 of FIG. 1, wherein the stake is inserted into a stake pocket.

Referring to FIGS. 1 and 2, the apparatus generally includes a spring latch 100 for securing a stake 102 in a stake pocket 401, in accordance with the present invention. The spring latch 100 suitably comprises a spring 104, a lever 110, bolt 118, a nut 120, and a catch protector 124.

Stake 102 forms a rack, along with a plurality of metal or wood horizontal slats, representatively shown by horizontal slat 210 (FIG. 2) and, typically, at least one additional stake 102. Slats 210 are affixed to stake 102 in the conventional manner, typically with a nut and bolt arrangement, or self tapping/self threading screws, or, in the case of metal slats and metal stakes, by welding. Stake 102 is suitably comprised of metal, preferably 12 gauge steel, and includes a plurality of sides 202, 204, 206, 208A and 208B (sides 208A and 208B, shown in FIG. 2, are collectively referred to as sides 208) forming a "C" cross section. The "C" cross section allows easy access to the inner portion of stake 102 and is relatively inexpensive to make, however a closed rectangle (wherein adjacent walls are substantially perpendicular to each other), or other configuration, may also be acceptable. Stake 102 is typically 46 inches in height, and sides 202 and 206 are preferably 1.5 inches in depth and side 204 preferably 3.0" in width.

Figure 3A:
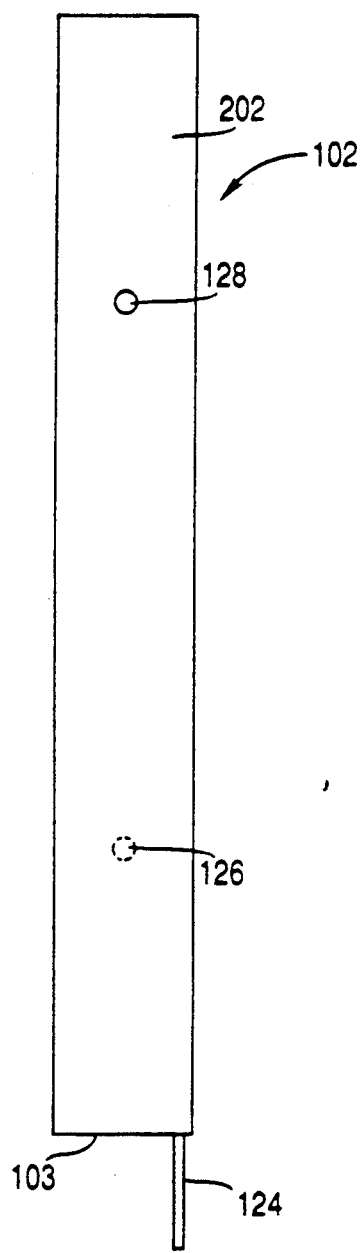
FIGS. 3A is a side view of the preferred exemplary embodiment.

Referring now to FIGS. 1, 2 and 3, stake 102 is provided with a lever hole 126 and a spring hole 128 (FIG. 3A). Lever hole 126, preferably 7/16 inches in diameter, is disposed to receive lever 110, and is, preferably, located on side 206 approximately 4.75 inches above a lower edge 103 of stake 102. Spring hole 128 is disposed to receive a bolt 118, used to secure spring 104 in the proper position, and is, preferably, located on side 202 approximately 10.25 inches above lower edge 103 of stake 102. As one skilled in the art will readily recognize, the disclosed locations of holes 126 and 128 are exemplary only, and may be changed in order to practice the invention with stakes of different sizes.

Referring again to FIG. 1, stake 102 further includes catch protector 124, which is, in the preferred embodiment, a rectangular piece of sheet metal with rounded lower corners, welded to the inner surface of sides 208 of stake 102. Catch protector 124 is approximately eight inches in height, extends approximately 1.25 inches below a lower edge 103 of stake 102, and is substantially the same width as side 204. When stake 102 is in a stake pocket 401 (FIG. 4) catch protector 124 extends below stake pocket 401, preventing spring 104 from being damaged. When stake 102 is pulled out of stake pocket 401 catch protector 124 protects spring 104, and provides structural support to the lower end of stake 102, in the event the rack, including stake 102, is dropped on the truck platform or ground.

Figure 3B:
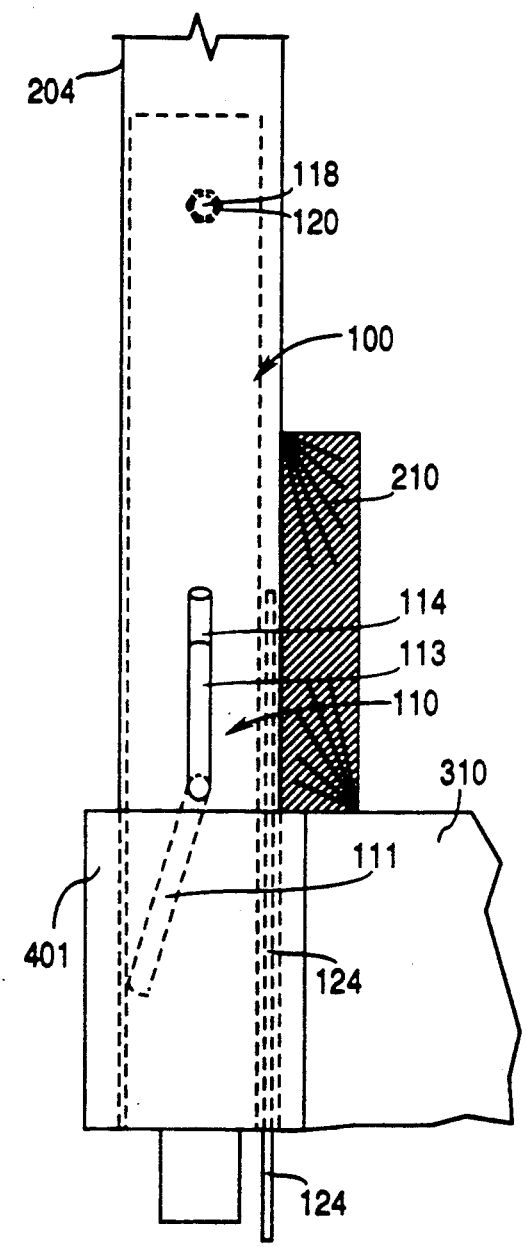
FIGS. 3B is a side view of the preferred exemplary embodiment, wherein the stake is inserted into a stake pocket.
Figure 4:
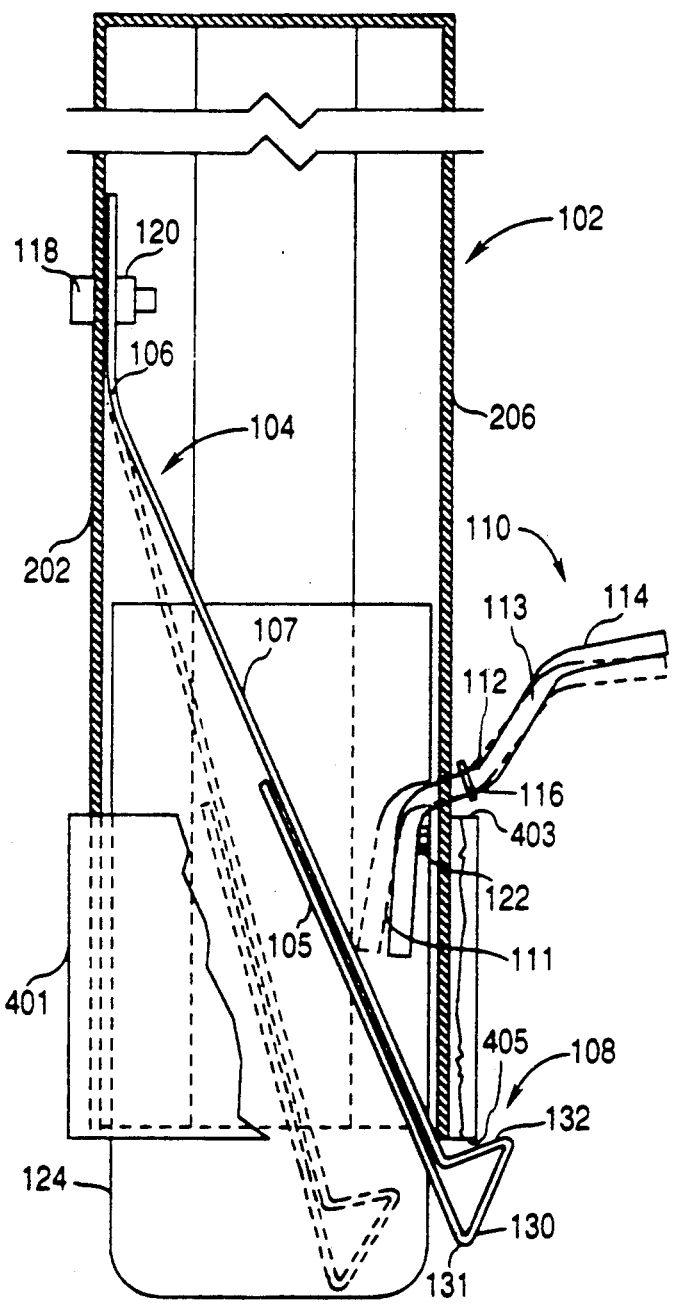
FIG. 4 is a front sectional view of the preferred exemplary embodiment, wherein the stake is inserted into a stake pocket.

Referring briefly to FIGS. 3B and 4, stake pocket 401 is typically a square enclosure, made of 0.25 inch steel, approximately four inches high, disposed on the outer periphery of platform 310. The specific pocket 401 for which the preferred exemplary embodiment was designed has a "C" cross section, and is welded to the outside of platform's 310 side rail, thereby forming the square enclosure. When the rack is to be used as a side or tail gate each stake 102 is inserted into a stake pocket 401, thereby holding the rack in an upright position. The rack is maintained in the proper vertical position in stake pocket 401 by slat 210, which rests on platform 310.

Spring 104 is provided to prevent stake 102 from being "bounced" out of stake pocket 401 when the truck is moving. Referring again to FIG. 1, spring 104, preferably comprises a fastening end 106, a leg 107, a latch end 108, and a doubled over section 105. Spring 104 is easily formed from flat spring steel, preferably 12 gauge stainless spring steel, by doubling over section 105, and spot welding section 105 to leg 107 in two or three places, or securing it with adhesive. All of the bends in the flat spring are suitably smooth curves to minimize or prevent high stress concentrates. Spring 104, shown in a resting position in FIG. 1, will be deflected from the resting position (shown by broken lines in FIG. 4) when force is applied to it, but will return to the resting position when the force is removed.

Fastening end 106 is provided with a hole through which bolt 118 is passed, thereby securing spring 104 to stake 102. As a skilled artisan will readily recognize, spring 104 could be attached to stake 102 in a variety of ways, such as, for example, using additional bolts, to secure the upper end to the center of side 204 of stake 102 using an angle bracket, or to opposite side 206 of stake 102.

Latch end 108 of spring 104 is provided to secure stake 102 in stake pocket 401. Latch end 108 is suitably triangularly shaped, having a leading edge 130, a back edge 131, and an upper edge 132. Referring to FIG. 4, when stake 102 is inserted into pocket 401, and downward pressure is applied, leading edge 130 of spring 104 encounters an upper edge 403 of pocket 401, thereby causing spring 104 to deflect inwardly. The deflection of spring 104 allows stake 102 to be inserted into stake pocket 401. When stake 102 has been inserted to the point where bottom slat 210 rests on platform 310, upper edge 132 of spring 104 passes below a lower edge 405 of stake pocket 401. Spring 104 then returns to the resting position and upper edge 132 of latch end 108 extends outward from stake pocket 401 and positively engages lower edge 405 of stake pocket 401, thereby latching stake 102 into stake pocket 401. Upper edge 132 of latch end 108 is angled slightly upward, so as to prevent latch end 108 from inadvertently unlatching.

Lever 110 is used to selectively deflect spring 104 from the resting position, to facilitate removal of stake 102 from stake pocket 401. Lever 110 is suitably comprised of four portions, and, preferably, formed from ⅜ inch diameter steel rod. The four portions are: an inner portion 111; a connecting portion 112; a first outer portion 113; and a force receiving portion 114. Connecting portion 112, generally angled slightly upward in a plane normal to side 206, when in a resting position, is inserted through lever hole 126 of stake 102. Inner portion 111, generally angled downward in a plane parallel to side 206, from lever hole 126 to the juncture of sides 206 and 204 (FIG. 3B), when in the resting position (thus forming a compound angle with connecting portion 112), is disposed inside of stake 102. First outer portion 113 is generally angled upward in a plane normal to side 206 when in the resting position and is disposed external of stake 102. Force receiving portion 114 is disposed to receive downward pressure and is angled upward slightly in a plane normal to side 206 when in the resting position. Lever 110 is maintained in the proper position by a retaining ring 116 and a nut 122. Retaining ring 116 is, in the preferred embodiment, a ⅜ inch lock washer welded to connecting portion 112, external of stake 102. After lever 110 is inserted into lever hole 126 nut 122 is welded to inner portion 111, adjacent connecting portion 112. Nut 122 prevents lever 110 from being withdrawn outward of hole 126 and retaining ring 116 prevents lever 110 from moving into stake 102 while allowing lever 110 to pivot about connecting portion 112. Thus, when downward pressure is applied on force receiving portion 114, lever 110 pivots about connecting portion 112, and inner portion 111 applies pressure to spring 104, as shown in FIG. 4. The compound angle formed between connecting portion 112 and inner portion 111 insures that lever 110 does not pivot horizontally, thereby preventing force receiving portion 114 from rubbing against slat 310. More specifically, a horizontal component to the pivoting motion of lever 110 forces inner portion 111 against side 204 of stake 102 (FIG. 3B), thereby preventing further horizontal motion.

When sufficient pressure is applied to force receiving portion 114, lever 110 forces spring 104 inward, ultimately causing latch end 108 to disengage lower edge 405 of stake pocket 401. Force receiving portion 114 is disposed at a height which allows a user to readily apply the necessary downward pressure by stepping on force receiving portion 114. Thus, to remove stake 102 from stake pocket 401, the user steps on force receiving portion 114 of lever 110, disengaging spring 104, and pulls upward on stake 102. Pressure need be applied to force receiving portion 114 only until stake 102 has been raised such that upper edge 132 of latch end 108 is above lower edge 405 of stake pocket 401. Thereafter spring 104 is maintained in an open position by the internal walls of stake pocket 401. Since the pressure applied to force receiving portion 114 of lever 110 may be applied by a person's foot while standing, stake 102 may be removed ergonomically. Furthermore, in the event that a person is standing on the ground, pressure may be applied to the force receiving portion 114 of lever 110 by pulling down. Stake 102 may then be easily withdrawn, still in an ergonomic fashion.

The length of spring 104 and the disposition of lever 110, in the preferred embodiment, avoid unnecessarily stressing, and thereby shortening the functional life of, spring 104. Spring 104 is relatively long and deflected only slightly, and, therefore, undergoes relatively little stress, when stake 102 is inserted into, or removed from, stake pocket 401. Furthermore, the center of gravity of lever 110, in the preferred embodiment, is internal of stake 102 to provide that, in the resting position, inner portion 111 is substantially disposed to lie against side 206 to avoid resting against spring 104. Thus, in the preferred embodiment, unnecessary stress to spring 104 is avoided, and spring 104 should have a relatively long functional life.

Figure 5:
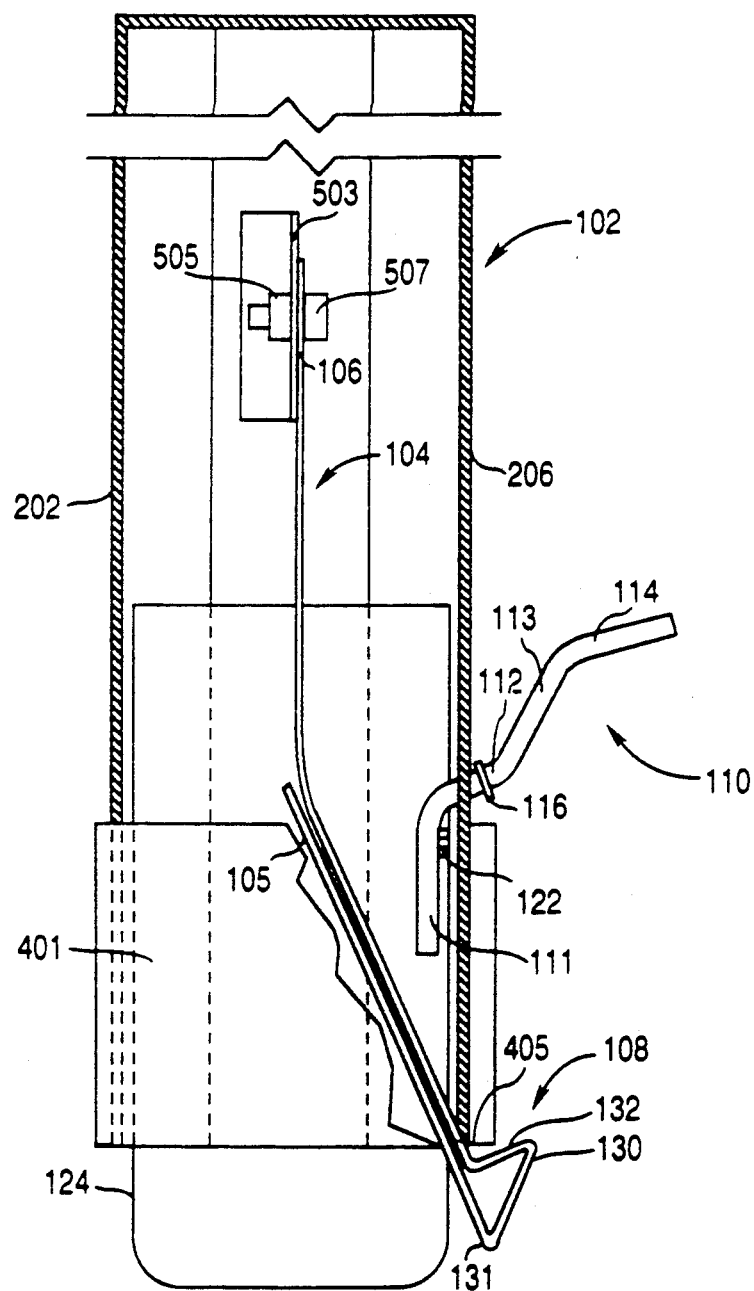
FIG. 5 is a front sectional view of an alternative exemplary embodiment.
Figure 6:
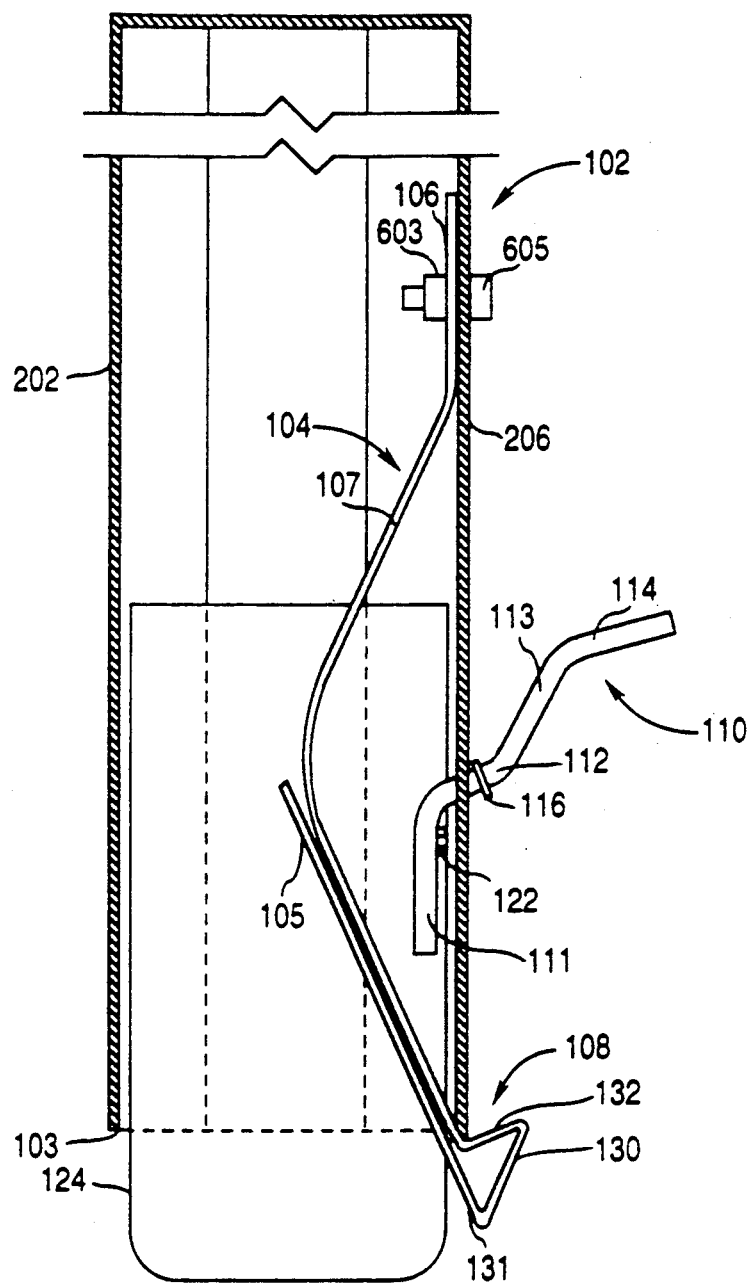
FIG. 6 is a front sectional view of a second alternative exemplary embodiment.

Alternative embodiments of the present invention are shown in FIGS. 5 and 6, wherein fastening end 106 of spring 104 is fastened to stake 102 on different inner sides of stake 102. In FIG. 5, spring 104 is fastened to an angle 503 by a nut 505 and a bolt 507. Angle 503 is welded to inner side 204 of stake 102. In FIG. 6, spring 104 is of an angled configuration and is fastened to inner side 206 of stake 102 by a nut 603 and a bolt 605. One skilled in the art may readily recognize that other alternative embodiments, such as a lever which is operated by applying pressure horizontally, or a wedge which is slid downward to deflect spring 104, may be employed while still falling within the scope of the appended claims.

Thus it should be apparent that the present invention provides a particularly advantageous stake latch and release mechanism. Although the invention has been described in conjunction with specific embodiments thereof, it is evident that many alternatives, modifications and variations will be apparent to those skilled in the art. Accordingly it is intended to embrace all such alternatives, modifications and variations that fall within the spirit and broad scope of the appended claims.

We claim:

1. An apparatus for securing and releasing a stake in a stake pocket, the apparatus comprising:
   a spring having a fastening end and a latch end;
   said fastening end attached to the stake;
   said spring being biased such that said latch end positively engages the stake pocket;
   a release means for selectively effecting disengagement of said latch end from the stake pocket in response to a force applied thereto;
   said release means including a first end accessibly disposed outside of the stake and a second end disposed in a predetermined relation with respect to said spring for selective cooperation with said spring;
   said release means being mounted to the stake such that force applied in a downward direction to said first end causes movement of said second end relative to said spring to move said latch end out of engagement with the stake pocket;
   wherein the stake has a first wall and a second wall, the second wall being substantially perpendicular to the first wall, wherein:
   the first wall has a release means receiving hole;
   said release means further comprising a connecting portion having an inner end and an outer end, said inner end connected to said second end of said release means, and said outer end connected to said first end of said release means;
   said second end disposed to generally extend downward at an angle from said connecting portion to the second wall; and
   said connecting portion disposed to generally slant upward, in a direction from said inner end to said outer end, when said release means is in a resting position, and further disposed to pass through said release means receiving hole, said inner end disposed internal said stake, said outer end disposed external said stake; and
   said first end has a force receiving portion disposed to generally slant upward, in a direction from said connecting portion to said first end when said release means is in the resting position.

2. The apparatus of claim 1 wherein said spring is comprised of flat spring steel bent to form said spring.

3. The apparatus of claim 1 wherein said spring is comprised of a flat section of resilient material bent to form said spring.

4. The apparatus of claim 1 further including a catch protector affixed to the stake, and extending vertically below the stake and said spring, whereby when the stake rests on said catch protector and said spring is deflected, said spring does not extend below said catch protector.

5. The apparatus of claim 1 wherein said latch end includes:
   a first edge sloping upward, in a direction from inside the stake to outside the stake, such that said first edge positively engages a lower edge of the stake pocket; and
   a second edge sloping downward, in a direction from outside the stake to inside the stake, such that said second edge engages an upper edge of the stake pocket and causes said spring to deflect about said fastening end in the event the stake is inserted into the stake pocket.

6. The apparatus of claim 1 wherein:
   a first stopper means is affixed to said release means external of said stake for preventing said second end from passing through said release means receiving hole; and
   a second stopper means is affixed to said release means internal of said stake for preventing said first end from passing through said release means receiving hole.

* * * * *